United States Patent [19]

Hinrichs

[11] Patent Number: 4,726,075
[45] Date of Patent: Feb. 23, 1988

[54] DISPOSABLE SIDE SHIELD FOR EYEGLASSES

[76] Inventor: Matthew T. Hinrichs, 3020 K, W. Prentiss Ave., Littleton, Colo. 80123

[21] Appl. No.: 937,976

[22] Filed: Dec. 4, 1986

[51] Int. Cl.⁴ ............................................... A61F 9/00
[52] U.S. Cl. ............................................ 2/13; 2/449; 351/44
[58] Field of Search ............... 2/13, 449, 451; 351/44, 351/45, 158

[56] References Cited

U.S. PATENT DOCUMENTS

| | | | |
|---|---|---|---|
| 900,444 | 10/1908 | Stickle | 2/13 |
| 1,021,175 | 3/1912 | Willson et al. | 2/449 |
| 1,161,100 | 11/1915 | Willson et al. | 2/451 |
| 1,527,237 | 2/1925 | Tully | 2/13 |
| 2,639,430 | 5/1953 | Gale | 351/45 X |
| 2,900,639 | 8/1959 | Lindstrom | 2/13 |
| 4,547,909 | 10/1985 | Bell | 351/158 X |

FOREIGN PATENT DOCUMENTS

| | | | |
|---|---|---|---|
| 2373807 | 8/1978 | France | 351/158 |
| 72623 | 6/1953 | Netherlands | 2/13 |
| 266739 | 2/1927 | United Kingdom | 2/13 |

*Primary Examiner*—Wm. Carter Reynolds
*Attorney, Agent, or Firm*—Fields, Lewis, Pittenger & Rost

[57] ABSTRACT

A disposable and readily removable universal side shield for a variety of styles of eyeglasses. Each side shield is specifically constructed to fit on either the left or right side of the eyeglasses. Each shield includes a flexible sheet including a base portion having an adhesive on an inner face for attaching to the top and sides of an eyeglass lens frame and a generally bell-shaped shield portion. At least three spaced slits extend from the base edge into the shield portion and are sufficiently close to allow the material between adjacent slits to be torn out by hand, forming a slot in a selected position. The slot receives a bow of the eyeglasses so that the shield straddles the bow along the inside of the bow when the shield is in place. The side shield closes the area between the lens and the eye of the wearer to wind, dirt, and the like when the shield is in use.

12 Claims, 6 Drawing Figures

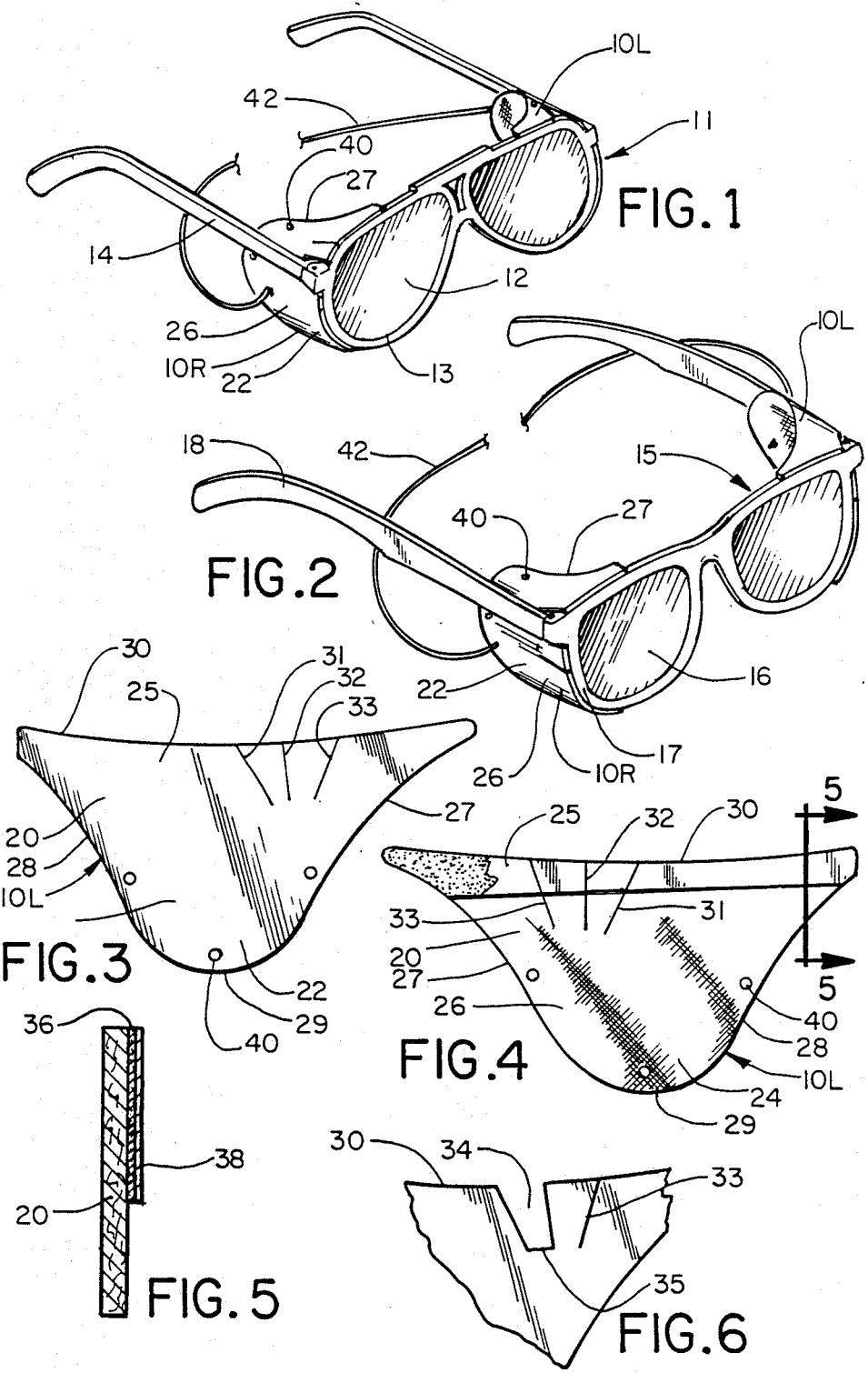

DISPOSABLE SIDE SHIELD FOR EYEGLASSES

TECHNICAL FIELD

This invention relates to shields for eyeglasses, and more particularly, to removable flexible side shields for closing the space between the lens and the face of the wearer.

BACKGROUND ART

A number of arrangements of shields for eyeglasses are known in the prior art. One previously used arrangement comprises a flexible side shield attached to the frame of the eyeglasses or clamped between the lens and the frame. Such a configuration is shown in U.S. Pat. No. 1,021,175 to Willson and Bourquin. The Willson invention is quite effective, but is not suited to allow for easy removability of the shield. Several arrangements for removable side eyeglass shields are known in the prior art. One such arrangement is provided by U.S. Pat. No. 1,161,100; however, the device provided in that patent requires several parts in addition to the shield itself in order to be effective. Eyeglass side shields have been developed in the prior art which are easily attachable and removable with a minimum of or no excess parts. However, none of those side shields attach firmly to the lens frame, and none provide protection from light, wind, dirt, or other impurities entering the space between the lens and the face from above the level of the lens.

DISCLOSURE OF THE INVENTION

In accordance with the present invent disposable side shield for a variety of styles of eyeglasses is provided. The side shield disclosed comprises a unitary flexible sheet having an inner face and an outer face and including a shield portion and a base portion with a convexly curved edge. The base portion has a plurality of spaced slits therein directed into the shield portion and preferably located to one side of the center thereof. These slits allow the weakened portion of the sheet between the slits to be torn out by hand, forming a slot extending inward into the shield portion from the base portion. When the shield is attached to eyeglasses, the slot receives the bow of the eyeglasses, allowing the shield portion and base to straddle the bow. Advantageously, the shield portion has a forehead edge shaped to conform to the forehead of the wearer, a cheek edge shaped to conform to the cheek of the wearer, and a rounded apex edge therebetween. An adhesive strip having a removable backing is provided along the base of the body for attaching the shield to eyeglasses along the top, bottom, and side of the lens frame. Preferably, the shield portion has at least one hole therein for receiving a strap to secure the eyeglasses to the head of the wearer. The flexible sheet may be of any suitable material such as leather, cloth, vinyl or the like.

Additional advantages of this invention will become readily apparent from the description which follows, together with the accompanying drawings.

BRIEF DESCRIPTION OF THE DRAWINGS

FIG. 1 is a perspective view of a pair or side shields embodying the present invention in use on a pair of standard eyeglasses;

FIG. 2 is a perspective view of a pair of side shields embodying the present invention in use on a pair of "cateye" style eyeglasses showing the slot in an alternative selected position;

FIG. 3 is a front elevational view showing the outer face of the left side shield;

FIG. 4 is a rear elevational view showing the inner face of the left side shield;

FIG. 5 is a cross-sectional view of the left side shield taken along line 5—5 of FIG. 4; and FIG. 6 is an enlarged partial view of the slot of the side shield.

BEST MODE FOR CARRYING OUT THE INVENTION

In accordance with the present invention as depicted in FIGS. 1-6, disposable left and right side shields designated 10L and 10R, respectively for eyeglasses are provided. The shields as shown in FIG. 1 are mounted on standard eyeglasses 11 having a pair of lenses 12, a pair of lens frames 13, and a pair of bows 14. The shields 10L and 10R shown in FIG. 2 are mounted on "cateye" style eyeglasses 15 having a pair of lenses 16, a pair of lens frames 17, and a pair of bows 18. With particular reference to the left side shield 10L in FIGS. 3-6, this is shown to comprise a unitary flexible body or sheet 20 which may be of a material such as leather, cloth, vinyl or the like. A preferred material is an expanded vinyl with a knit back. This preferred material is available in bright colors such as yellow, red, brown, blue, etc. which can be selected to match the color scheme of the user.

The sheet 20 has an outer face 22, an inner face 24, and includes base portion 25 and a shield portion 26 extending away from the base portion. Shield portion 26 has an inwardly convex forehead edge 27, an inwardly convex cheek edge 28, and rounded apex edge 29 and has a generally bell-shaped profile. Forehead edge 27 and cheek edge 28 are curved to fit the forehead and cheek of the wearer, respectively, when the side shield 10 is in place on the eyeglasses. The base portion 25 shown has slightly convexly curved base edge 30 and has three spaced slits 31, 32 and 33 directed through the base edge into the shield portion 26. Outer slits 31 and 32 are preferably on an incline to converge inwardly toward the center of the sheet to narrow the width of the material to be torn. The slits are located to the porehead side of center of the base portion. The weakened material between the slits 31 and 32 may be torn out by hand leaving a slot 34, having tear edge 35, for fitting the eyeglass 11 as shown in FIGS. 1 and 6.

In use, as shown in FIGS. 1 and 2, the slot 34 receives a bow 14 so that the sheet 20 extends along both sides of the bow and along the inside of the bow. The shield functions to substantially close the space between the lens and the face of the wearer to wind, dirt, sun and the like and folds against the lens when the bows are folded. Providing three slits allows the wearer to select the position of the slot relative to a particular style of eyeglass to achieve the best fit between the side shield and the bow and to provide maximum comfort for the wearer. Alternative slot selections for differing eyeglass styles are illustrated in FIGS. 1 and 2.

As best seen in FIG. 5, a fastening means in the form of a layer of adhesive 36 is located on the inner face 24 along the base portion 25 is covered by a removable backing 38 prior to use. To attach the side shield 10 to the eyeglasses 11 the wearer tears out material between two selected slits 31 and 32, forming a slot 34 in the desired position. The adhesive backing 38 may then be removed and the base portion 25 adhesively attached along the top, side and bottom of a lens frame 16, with the shield portion 26 positioned so that the sheet 20 straddles a bow 14 of the eyeglasses 11. Advantageously, holes 40 for receiving a strap 42 may be provided, allowing the eyeglasses to be secured to the wearer. Preferably, there is a hole 40 on the vertical center line of the shield portion adjacent edge 29 and a hole on each side of the center hole intermediate edge 29 and the base portion with one hole 40 being adjacent edge 27 and the other hole 40 being adjacent edge 28.

This invention has been described in detail with reference to a particular embodiment thereof, but it will be understood that various other modifications can be effected within the spirit and scope of this invention.

I claim:

1. A side sheild for a variety of styles of eyeglasses having a pair of lens frames with lenses and a bow pivotally attached to each lens frame, said shield comprising:

a flexible sheet having an inner face and an outer face and including a base portion and a shield portion extending away from said base portion, said base portion and said shield portion each having a forehead portion and a cheek portion, said base portion having a base edge and at least two slits extending in from said base edge for receiving a bow therebetween so that the sheet extends on both sides of the bow along the inside of the bow, said slits being offset from the center toward the forehead side of said base edge for positioning said cheek portion in close proximity to the cheek of a wearer, said base portion having fastening means on said inner face for attaching said base portion to the top and along the side of said lens frame, said forehead portion and said cheek portion of said shield portion substantially closing the space the between said lens and the forehead and cheek of a wearer respectively when the glasses are on the wearer and folding against said lens when the bows are folded.

2. A side shield for eyeglasses as claimed in claim 1, wherein:
said base edge is slightly convexly curved.

3. A side shield for eyeglasses as claimed in claim 1, wherein:
said fastening means is a layer of adhesive extending along the inner face of said base portion.

4. A side shield for eyeglasses as claimed in claim 1, wherein:
said shield portion is generally bell-shaped.

5. A side shield for eyeglasses as claimed in claim 1, wherein:
selected of said slits are inclined to converge in said sheet.

6. A side shield for eyeglasses as claimed in claim 1, wherein:
said shield portion has at least one aperture for receiving a strap for securing the eyeglasses to the head of a wearer.

7. A side shield for eyeglasses as claimed in claim 1, wherein:
said shield portion includes a forehead edge curved to substantially conform to the forehead of a wearer, a cheek edge curved to substantially conform to the cheek of a wearer, and a rounded apex edge therebetween.

8. A side shield for eyeglasses as claimed in claim 1, wherein:
said slits have internal ends sufficiently close together to allow the material between said slits to be tearably removed by hand.

9. A disposable side shield for a variety of styles of eyeglasses having a pair of lens frames with lenses and a bow pivotally attached to each lens frame, said shield comprising:

a flexible sheet having an inner face and an outer face and including a generally bell-shaped shield portion and a base portion having a base edge, said base portion having fastening means on said inner face for attaching said base portion to the top and along the side of said lens frame, said sheet having at least three spaced slits forming weakened sections therebetween so that said weakened sections may be removed by pulling the material between adjacent slits, forming a slot in the shield portion for receiving a bow so that the sheet extends on both sides of the bow along the inside of the bow said shield portion substantially closing the space between said lens and the face of a wearer when the glasses are on the wearer and folding against said lens when the bows are folded.

10. A disposable side shield for a variety of styles of eyeglasses having a pair of lens frames with lenses and a bow pivotally attached to each lens frame, said shield comprising:

a flexible sheet having an inner and an outer face and including:
a shield portion having a forehead edge shaped to conform to the forehead of a wearer, a cheek edge shaped to conform to the cheek of a wearer, and a rounded apex edge therebetween;
a base portion having a slightly curved base edge, said base portion having at least three slits extending from said base edge through said base portion into said shield portion on one side of the center of said base portion and forming weakened sections therebetween so that said weakened sections may be tearably removed by hand, forming a slot having a tear edge and receiving a bow so that the sheet extends on both sides of the bow along the inside of the bow, said base portion having an adhesive on said inner face covered by a removable backing, said adhesive attaching said base portion to the top and along the side of said lens frame, said shield portion substantially closing the space between said lens and the face of a wearer when the glasses are on the wearer and folding against said lens when the bows are folded.

11. A side shield for a variety of styles of eyeglasses having a pair of lens frames with lenses and a bow pivotally attached to each lens frame, said shield comprising:

a flexible sheet having an inner face and an outer face and including a base portion and a shield portion extending away from said base portion, said base portion having a base edge and a plurality of spaced slits extending into said base edge and shield portion for receiving a bow so that the sheet extends on both sides of the bow along the inside of the bow, said slits having internal ends sufficiently close together to allow the material between adjacent slits to be tearably removed by hand, said base portion having fastening means on said inner face for attaching said base portion to the top and along the side of said lens frame, said shield portion substantially closing the space the between said lens and the face of a wearer when the glasses are on the wearer and folding against said lens when the bows are folded.

12. A side shield for eyeglasses as claimed n claim 11, wherein:
said slits are located to one of center of said base portion.